United States Patent
Krishnamoorthy et al.

(10) Patent No.: US 11,250,362 B2
(45) Date of Patent: Feb. 15, 2022

(54) MACHINE LEARNING BASED DECENTRALIZED BUSINESS PLANNING SYSTEM

(71) Applicant: Bank of America Corporation, Charlotte, NC (US)

(72) Inventors: Madhusudhanan Krishnamoorthy, Chennai (IN); Samrat Bhasin, Bangalore (IN); Vaasudevan Sundaram, Chennai (IN)

(73) Assignee: Bank of America Corporation, Charlotte, NC (US)

(*) Notice: Subject to any disclaimer, the term of this patent is extended or adjusted under 35 U.S.C. 154(b) by 32 days.

(21) Appl. No.: 16/901,391

(22) Filed: Jun. 15, 2020

(65) Prior Publication Data
US 2021/0390478 A1    Dec. 16, 2021

(51) Int. Cl.
*G06Q 10/06* (2012.01)
*G06N 20/00* (2019.01)

(52) U.S. Cl.
CPC ....... *G06Q 10/06313* (2013.01); *G06N 20/00* (2019.01)

(58) Field of Classification Search
None
See application file for complete search history.

(56) References Cited

U.S. PATENT DOCUMENTS

| 8,239,498 | B2 * | 8/2012 | Kilpatrick | G06Q 10/0875 709/220 |
| 8,782,201 | B2 * | 7/2014 | Kephart | G06Q 10/06 709/224 |

(Continued)

FOREIGN PATENT DOCUMENTS

| CA | 3013603 A1 * | 2/2020 | ........... H04L 9/3218 |
| CA | 3061603 A1 * | 5/2020 | ........... H04L 9/0643 |

(Continued)

OTHER PUBLICATIONS

Kenchaiah, Nagaraj. "Distributed Policy Management for Service Provider Chains." (2020). (Year: 2020).*

(Continued)

*Primary Examiner* — Brian M Epstein
*Assistant Examiner* — Derick J Holzmacher
(74) *Attorney, Agent, or Firm* — Banner & Witcoff, Ltd.

(57) ABSTRACT

Aspects of the disclosure relate to a machine learning based decentralized business planning system. A computing platform may identify an event likely to impact one or more business operations. Subsequently, the computing platform may receive, for the event, data from one or more sources of data. Then, the computing platform may generate a data structure including a plurality of nodes, where the plurality of nodes corresponds to the received data. Then, the computing platform may authenticate, by utilizing a distributed ledger-based verification system, the plurality of nodes. Subsequently, the computing platform may perform, based on business rules applicable to the one or more business operations, analytics on the plurality of authenticated nodes. Then, the computing platform may generate, based on the analytics, a contingency plan to mitigate the impact to the one or more business operations, and may provide, via an interactive graphical user interface, the contingency plan.

19 Claims, 11 Drawing Sheets

(56) References Cited

U.S. PATENT DOCUMENTS

| | | | |
|---|---|---|---|
| 8,996,397 B2* | 3/2015 | Grace | G06Q 10/063114 |
| | | | 705/7.39 |
| 10,127,539 B2* | 11/2018 | Castinado | G06Q 20/4014 |
| 10,361,942 B2* | 7/2019 | Donovan | H04L 43/0817 |
| 10,713,224 B2* | 7/2020 | Kephart | G06F 16/284 |
| 10,749,791 B2* | 8/2020 | Kephart | H04L 45/22 |
| 10,936,984 B2* | 3/2021 | Huneycutt | G06F 16/248 |
| 10,970,406 B2* | 4/2021 | Huneycutt | G06F 8/65 |
| 10,977,283 B2* | 4/2021 | Huneycutt | G06F 21/577 |
| 11,023,835 B2* | 6/2021 | Huneycutt | G06F 16/25 |
| 2004/0064436 A1 | 4/2004 | Breslin et al. | |
| 2005/0144062 A1 | 6/2005 | Mittal et al. | |
| 2005/0165633 A1 | 7/2005 | Huber | |
| 2017/0308421 A1* | 10/2017 | Angeles | G06F 11/0709 |
| 2018/0165416 A1* | 6/2018 | Saxena | G06F 21/6245 |
| 2018/0165588 A1* | 6/2018 | Saxena | G06Q 20/02 |
| 2018/0165598 A1* | 6/2018 | Saxena | G06N 3/006 |
| 2018/0165612 A1* | 6/2018 | Saxena | G06N 20/00 |
| 2018/0165758 A1* | 6/2018 | Saxena | G06Q 30/02 |
| 2019/0147074 A1* | 5/2019 | Kephart | G06F 16/25 |
| | | | 707/803 |
| 2019/0208053 A1* | 7/2019 | Nitidharmatut | H04M 3/42068 |
| 2020/0073560 A1* | 3/2020 | Adanve | G16B 50/30 |
| 2020/0145225 A1 | 5/2020 | Faye et al. | |
| 2020/0274971 A1* | 8/2020 | Nitidharmatut | H04M 3/5191 |
| 2021/0297527 A1* | 9/2021 | Nitidharmatut | H04W 4/24 |
| 2021/0303553 A1* | 9/2021 | Zanpure | G06F 16/2379 |

FOREIGN PATENT DOCUMENTS

| | | | | |
|---|---|---|---|---|
| EP | 3651099 A1 * | 5/2020 | | G06Q 20/382 |
| EP | 3726412 A1 * | 10/2020 | | G06F 21/602 |
| WO | WO-2020106650 A1 * | 5/2020 | | G06F 16/2379 |
| WO | WO-2020210730 A1 * | 10/2020 | | H04L 9/3239 |

OTHER PUBLICATIONS

Ma, Shenglan, et al. "A blockchain-based risk and information system control framework." 2018 IEEE 16th Intl Conf on Dependable, Autonomic and Secure Computing, 16th Intl Conf on Pervasive Intelligence and Computing, 4th Intl Conf on Big Data Intelligence and Computing and Cyber Science and Technology (Year: 2018).*

Holochains for Distributed Data Integrity Project Profiles 6 pages.

* cited by examiner

MACHINE LEARNING BASED DECENTRALIZED BUSINESS PLANNING SYSTEM

BACKGROUND

Aspects of the disclosure relate to deploying digital data processing systems to generate a business continuity plan. In particular, one or more aspects of the disclosure relate to a machine learning based decentralized business planning system.

In the event of a disruption to business activities of an enterprise organization, the organization may utilize various methods to determine business continuity plans to mitigate negative impacts of the disruption. Such determining may be time-sensitive and may need to be performed in real-time. In some instances, the determining may be predictive to eliminate and/or minimize negative effects of a potential disruption. Generally, such determining may rely on a plurality of information sources. Ensuring accuracy of the underlying information may be highly advantageous to providing reliable business continuity plans. In many instances, however, it may be difficult to validate the plurality of information sources in real-time, and undertake appropriate remediation measures to prevent and/or mitigate an impact to enterprise services with speed and accuracy, while also attempting to optimize network resources, bandwidth utilization, and efficient operations of the associated computing infrastructure.

SUMMARY

Aspects of the disclosure provide effective, efficient, scalable, fast, reliable, and convenient technical solutions that address and overcome the technical problems associated with a decentralized business planning system.

In accordance with one or more embodiments, a computing platform having at least one processor, and memory storing computer-readable instructions that, when executed by the at least one processor, cause the computing platform to identify an event likely to impact one or more business operations. Subsequently, the computing platform may receive, for the event, data from one or more sources of data. Then, the computing platform may generate, for the event, a data structure including a plurality of nodes, where the plurality of nodes corresponds to the received data. Then, the computing platform may authenticate, by utilizing a distributed ledger-based verification system, the plurality of nodes. Subsequently, the computing platform may perform, based on business rules applicable to the one or more business operations, analytics on the plurality of authenticated nodes. Then, the computing platform may generate, based on the analytics, a contingency plan to mitigate the impact to the one or more business operations. Subsequently, the computing platform may provide, via an interactive graphical user interface, the contingency plan.

In some embodiments, the computing platform may rank, in real-time and based on a statistical model, the one or more sources of data, where the authenticating may be based on the rank.

In some embodiments, the computing platform may train a machine learning model to authenticate the plurality of nodes.

In some embodiments, the computing platform may train a machine learning model to rank the one or more sources of data.

In some embodiments, the computing platform may determine a severity level associated with the event, and where the contingency plan may be based on the severity level. In some embodiments, the computing platform may train a machine learning model to determine the severity level.

In some embodiments, the computing platform may train a machine learning model to predict the contingency plan based on historical data.

In some embodiments, the computing platform may filter the received data based on a security profile applicable to the computing platform. In some embodiments, the computing platform may monitor, via the graphical user interface, interactions with the contingency plan, and, where the filtering may be based on the monitoring. In some embodiments, the computing platform may train a machine learning model to perform the filtering based on the monitoring.

In some embodiments, the one or more sources of data may include a Light Detection and Ranging Technology (LiDAR), a traffic application programming interface (API), a news feed, employee information, location data, topographical data, modes of transport, or available accommodations.

In some embodiments, the computing platform may receive additional data from a trusted source. Subsequently, the computing platform may update, based on the trusted source, a ranking of the one or more sources of data.

In some embodiments, the computing platform may cause, based on the contingency plan, a deployment of resources. Subsequently, the computing platform may evaluate the deployment of the resources for effectiveness in mitigating the impact to the one or more business operations. In some embodiments, the computing platform may train a machine learning model to perform, based on the evaluating, one or more of a filtering of the received data or the authenticating of the plurality of nodes.

In some embodiments, performing the analytics may be based on one or more of: content from a thesaurus, clustering techniques, content from an ontology, semantic processing techniques, entity extraction techniques, and relevancy.

In some embodiments, the distributed ledger-based verification system may be based on Holochain technology.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
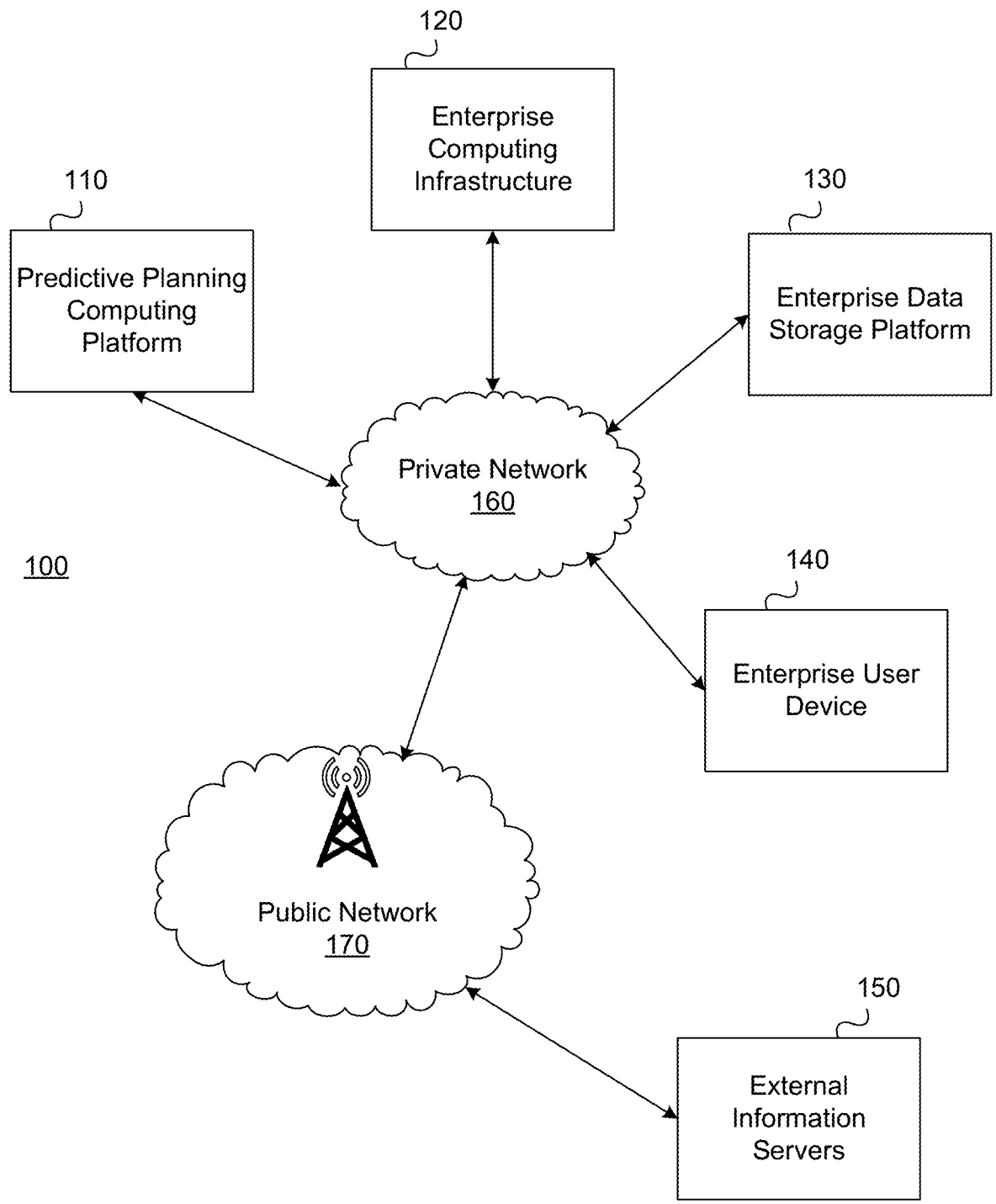
FIGS. 1A and 1B depict an illustrative computing environment for a machine learning based decentralized business planning system.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations may be subject to various natural, and/or man-made events that may potentially disrupt operations of, and goods and/or services provided by, the organization. Business continuity plans are generally developed to mitigate effects of such events. However, such business continuity planning is generally a human centric decision, and may be affected by various factors such as, for example, weather, traffic, political unrest, topography, density of population, availability of resources, and so forth. Given the plethora of factors that may change in real-time, humans may not be able to understand correlations between various factors, understand how a change to one may impact the others, and/or detect patterns, or predict outcomes. Also, for example, the various factors may depend on real-time changes that may need to be monitored at regular intervals. As the business continuity plan, and recommended steps, may depend on variety of factors, it may be of significant importance to verify the data as valid, before relying on such data. Accordingly, data received from one or more sources (e.g., feeds from social networks) may need to be cross-validated, and may necessitate a robust framework for decentralized validation and verification. Lack of an effective and/or comprehensive business continuity plan may cause a significant loss to business. This may also create challenges to maintaining employee safety as employees may be stranded in a potentially unsafe area.

Accordingly, it may be of significant importance for an enterprise organization to devise ways in which to automatically assess an event and create an effective, actionable business continuity plan in real-time, so as to identify areas of concern and provide recommendations with speed and accuracy.

Some aspects of the disclosure relate to correlating data from various sources, where the data may be validated utilizing a Holo Chain framework, performing analytics on the validated data to generate insights and/or recommendations. In many aspects, as described herein, business continuity planning is automated, and a Proof of Work (PoW) and Proof of Stake (PoS), based on, for example, a distributed sloppy hash table (DHT) protocol, may not be needed.

As described herein, an automated end-to-end (E2E) decision framework for business continuity planning (BCP) is provided. Also, for example, a mechanism is built in to receive additional, reliable information to override automated recommendations based on data feed. A flexible, scalable, distributed, and adaptive architecture enables additional and/or alternative sources of data, analytics, machine learning models, and so forth, to be integrated into the framework. Utilizing a Holo Chain framework reduces computational time, complexity, and moves away from a requirement for PoW and/or PoS.

Figure 1B:
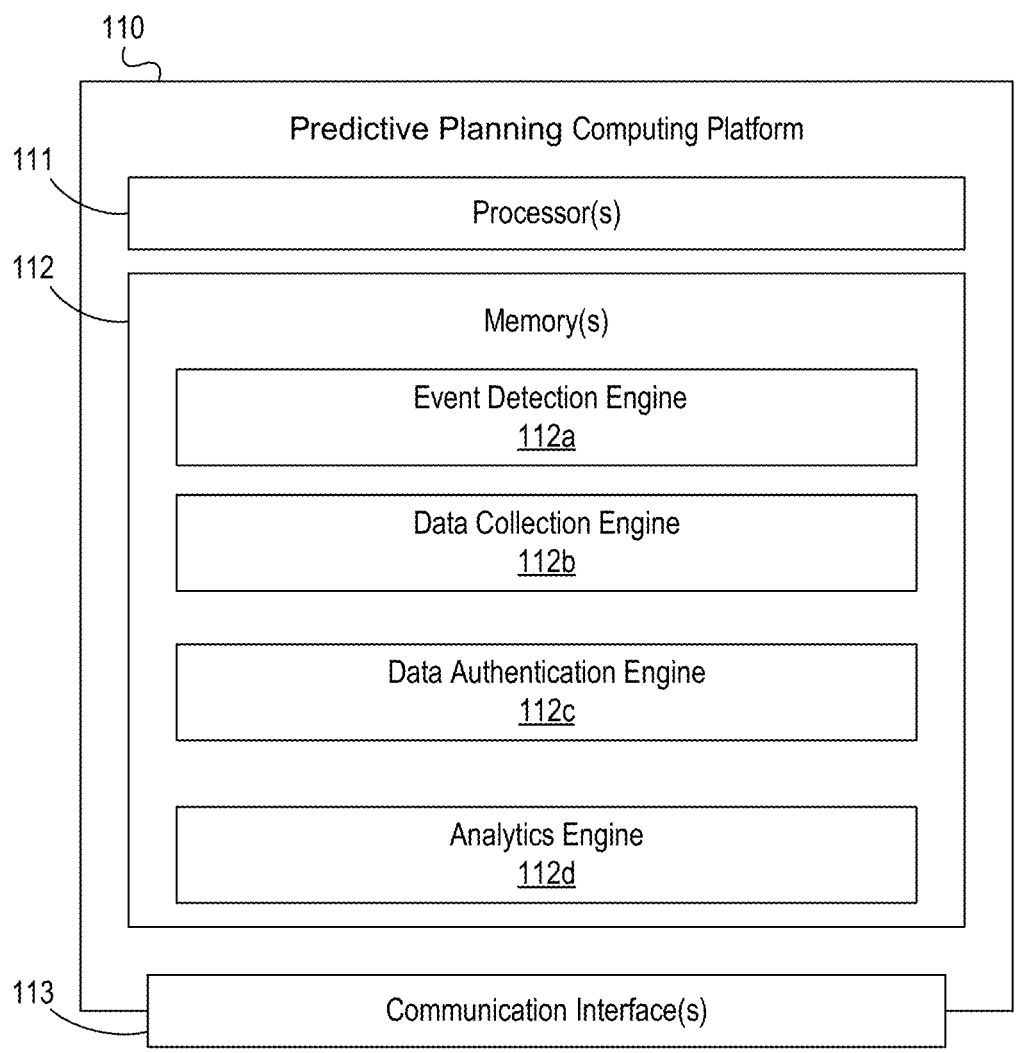

FIGS. 1A and 1B depict an illustrative computing environment for an automated and adaptive validation of a user interface. Referring to FIG. 1A, computing environment 100 may include one or more computer systems. For example, computing environment 100 may include a predictive planning computing platform 110, enterprise computing infrastructure 120, an enterprise data storage platform 130, enterprise user device 140, and external information servers 150.

As illustrated in greater detail below, predictive planning computing platform 110 may include one or more computing devices configured to perform one or more of the functions described herein. For example, predictive planning computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise user devices 140. For example, enterprise computing infrastructure 120 may be configured to host, execute, and/or otherwise provide one or more applications, security applications, human resource applications, travel scheduling applications, meeting coordination applications, emergency alert systems, and/or other applications associated with an enterprise server. In some instances, enterprise computing infrastructure 120 may be configured to provide various enterprise and/or back-office computing functions for an enterprise organization. For example, enterprise computing infrastructure 120 may include various servers and/or databases that store and/or otherwise maintain customer information, such as personal information including owner information, locations of offices, hours of operation, and/or other information. In addition, enterprise computing infrastructure 120 may process and/or otherwise execute actions based on scripts, commands and/or other information received from other computer systems included in computing environment 100. Additionally or alternatively, enterprise computing infrastructure 120 may receive instructions from predictive planning computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, business rules, emergency scenarios, historical data, script validation logs, reports, employee information, travel information, data on enterprise resources, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise user device 140 may be a personal computing device (e.g., desktop computer, laptop computer) or mobile computing device (e.g., smartphone, tablet, wearable device). In addition, enterprise user device 140 may be linked to and/or used by a specific user (who may, e.g., be a customer of an organization operating predictive planning computing platform 110). Also, for example, user of enterprise user device 140 may use enterprise user device 140 to perform receive emergency alerts.

External information servers 150 may include one or more computing devices and/or other computer components (e.g., processors, memories, communication interfaces). In addition, enterprise computing infrastructure 120 may be configured to host, execute, and/or otherwise provide one or more data sources for information from LiDAR, traffic application programming interfaces (API), news feeds (e.g., social network, media network), city data, employee data, topography, transportation data, accommodation data, and so forth. In some embodiments, external information servers 150 may be a personal computing device (e.g., desktop computer, laptop computer) or mobile computing device (e.g., smartphone, tablet, wearable device), that may be a source of information.

Computing environment 100 also may include one or more networks, which may interconnect one or more of predictive planning computing platform 110, enterprise computing infrastructure 120, enterprise data storage platform 130, enterprise user device 140, and/or external information servers 150. For example, computing environment 100 may include a private network 160 (which may, e.g., interconnect predictive planning computing platform 110, enterprise computing infrastructure 120, enterprise data storage platform 130, enterprise user device 140, and/or one or more other systems which may be associated with an organization, and public network 170 (which may, e.g., interconnect enterprise user device 140 with private network 160 and/or one or more other systems, public networks, sub-networks, and/or the like). Public network 170 may be a cellular network, including a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect enterprise user device 140 and one or more other devices with each other).

In one or more arrangements, enterprise computing infrastructure 120, enterprise data storage platform 130, enterprise user device 140, and/or external information servers 150, and/or the other systems included in computing environment 100 may be any type of computing device capable of receiving input via a user interface, and communicating the received input to one or more other computing devices. For example, enterprise computing infrastructure 120, enterprise data storage platform 130, enterprise user device 140, and/or external information servers 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of predictive planning computing platform 110, enterprise computing infrastructure 120, enterprise data storage platform 130, enterprise user device 140, and/or external information servers 150, may, in some instances, be special-purpose computing devices configured to perform specific functions.

Referring to FIG. 1B, predictive planning computing platform 110 may include one or more processors 111, memory 112, and communication interface 113. A data bus may interconnect processor 111, memory 112, and communication interface 113. Communication interface 113 may be a network interface configured to support communication between predictive planning computing platform 110 and one or more networks (e.g., network 160, network 170, a local network, or the like). Memory 112 may include one or more program modules having instructions that when executed by processor 111 cause predictive planning computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of predictive planning computing platform 110 and/or by different computing devices that may form and/or otherwise make up predictive planning computing platform 110. For example, memory 112 may have, store, and/or include an event detection engine 112a, a data collection engine 112b, a data authentication engine 112c, and a analytics engine 112d. Event detection engine 112a may have instructions that direct and/or cause predictive planning computing platform 110 to identify an event likely to impact one or more business operations. Data collection engine 112b may have instructions that direct and/or cause predictive planning computing platform 110 to receive, for the event, data from one or more sources of data. In some embodiments, data collection engine 112b may have instructions that direct and/or cause predictive planning computing platform 110 to generate, for the event, a data structure comprising a plurality of nodes, wherein the plurality of nodes corresponds to the received data. Data authentication engine 112c may have instructions that direct and/or cause predictive planning computing platform 110 to authenticate, by utilizing a distributed ledger-based verification system, the plurality of nodes. Analytics engine 112d may have instructions that direct and/or cause predictive planning computing platform 110 to perform, based on business rules applicable to the one or more business operations, analytics on the plurality of authenticated nodes. In some embodiments, analytics engine 112d may have instructions that direct and/or cause predictive planning computing platform 110 to generate, based on the analytics, a contingency plan to mitigate the impact to the one or more business operations. In some embodiments, analytics engine 112d may have instructions that direct and/or cause predictive planning computing platform 110 to provide, via an interactive graphical user interface, the contingency plan.

Figure 2:
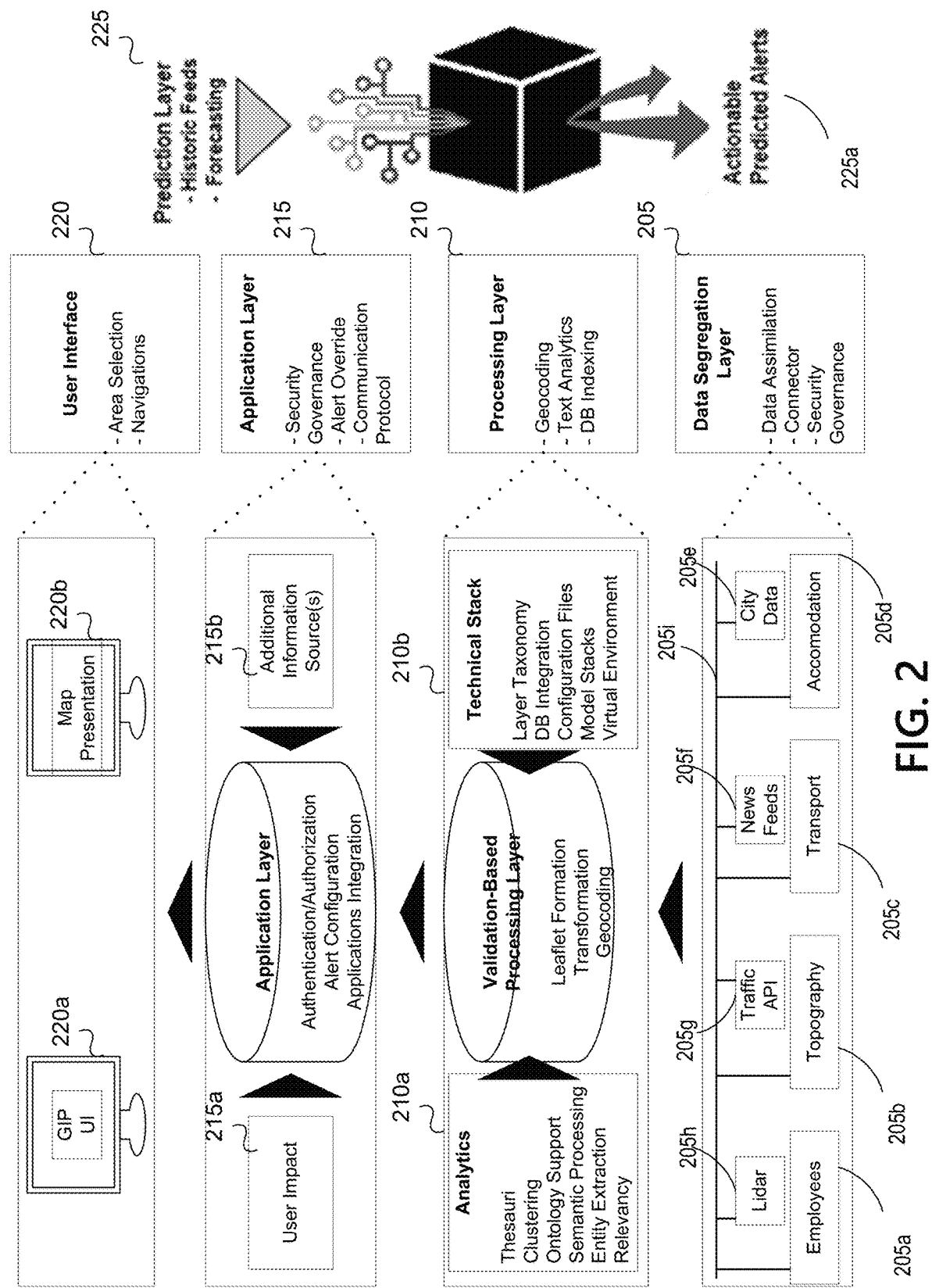
FIG. 2 depicts an illustrative architecture for a machine learning based decentralized business planning system.

FIG. 2 depicts an illustrative architecture for a machine learning based decentralized business planning system. In some embodiments, predictive planning computing platform 110 may include a data segregation layer 205 that may be configured to identify an event likely to impact one or more business operations. Generally, based on socio-economic, political, weather, and other factors, predictive planning computing platform 110 may be configured to determine a business plan to ensure that disruptions to enterprise activities are minimized, and/or removed. The term "event" as used herein, may generally refer to any event that may have a potential impact to an organization's activities. For example, the event may be a disruption to traffic (e.g., congestion, delayed or canceled public transportation systems, an accident, street closures), a weather related disruption (e.g., floods, cyclones, hurricanes, tornadoes, heavy rainfall, storms, extreme heat), a disruption due to a natural disaster (e.g., earthquakes, volcanoes, tsunamis), political disruptions (e.g., political rallies, voting related activities, visits by prominent political leaders), disruptions due to events affecting public health, social upheavals, riots, curfews, acts of war, and so forth.

Predictive planning computing platform 110 may be configured to identify such an event, for example, by automatically monitoring and analyzing news feeds, feeds from social networks, input from enterprise users, and so forth. Upon identification of an event, a potential impact, and one or more steps to mitigate the impact, need to be determined. For example, the event may limit employees from travelling to work and may need to be instructed to work from home. In some instances, employees may be provided with safe accommodation. Decisions such as these may have far-reaching effects, and may need to be deliberative, and based on verified reports, and good business intelligence.

In some embodiments, data segregation layer 205 may be configured to receive, for the event, data from one or more sources of data. For example, data may relate to employees 205a, topography 205b, transportation 205c, accommodation 205d, city data 205e, news feeds 205f, traffic APIs 205g, and Light Detection and Ranging Technology (LiDAR) 205h. Generally, the one or more sources of data may be communicatively linked via a bus 205i.

For example, data related to employees 205a may include their residential information, a latitude/longitude associated with them, one or more addresses, information about commuting patterns, traffic routes, preferences for mode of transportation, and so forth. For example, such data may include in the employee works from home, commutes from the suburb to the city, drives to work, parks at a facility, commutes via a train or a bus, and so forth.

Data related to topography 205b may be indicative of an overall geographic location, geographic properties, information related to terrain, and so forth. For example, such data may indicate if the terrain is flat, hilly, heavily forested, next to a river (E.G., that may be cresting), on the coast, and so forth.

Data related to transportation 205c may include information such as whether a mode of transportation include a personal vehicle, public transportation, company provided transportation, and so forth. For example, a company executive may be on a visit, and data segregation layer 205 may be configured to determine if the executive will travel from an airport to the office in a taxi, a company provided transportation, or public transportation.

Data related to accommodation 205d may include hotels and/or other accommodations available for use by the organization. For example, one or more hotels may be a preferred choice for the organization. For example, a company may have an office located in downtown, and a hotel one block away may be a preferred choice for accommodation for visitors to the office location.

City data 205e may include information related to hospitals, emergency services, evacuation procedures, locations of points of interest, news related to a city's response to a public health related event, a protest, a riot, a major construction, a bridge closure, and so forth.

News feeds 205f may be news and/or weather related information from one or more sources. For example, news sources may include one or more news servers, broadcast channels, radio networks, web-based sources of news, social media networks, blogposts, a weather channel, and so forth.

Data from traffic APIs 205g may include data associated with traffic alerts, accidents, street closures, and so forth. Such traffic data may be received from a news channel, mobile applications for traffic related information, and so forth.

LiDAR data 205h may include three-dimensional geometrical attributes of geographic locations. For example, such data may identify low-lying areas of a city that may be potentially affected by flood events.

In some embodiments, data segregation layer 205 may be configured to receive, for the event, data from one or more sources of data. For example, the event may be weather related, and data segregation layer 205 may be configured to receive news feeds 205f from a weather channel, traffic APIs 205g, and so forth. As another example, the event may be a flood, and data segregation layer 205 may be configured to receive news feeds 205f from a weather channel, data from a LiDAR 205h, data related to topography 205b, and so forth.

In some embodiments, data segregation layer 205 may be configured to select, based on the event, the one or more sources of data. For example, a type and quantity of data may depend on the event. For example, for an executive's visit to an office location, data segregation layer 205 may not need to receive data from all potential places of accommodation, and/or transportation. For example, the place of accommodation and a mode of transport may be predetermined in such instances, and data segregation layer 205 may be configured to select the one or more sources of data to be weather related data from news feeds 205f, data from traffic APIs 205g, As another example, the event may be a fire in an office location, and data segregation layer 205 may be configured to select data related to emergency services, nearby hospitals, fire stations proximate to the office location, traffic related information, evacuation procedures for the building, information related to a number of affected employees, and so forth.

In some embodiments, data segregation layer 205 may be configured to rank, in real-time and based on a statistical model, the one or more sources of data. For example, news feeds 205f may include news from an established a verifiable source (e.g., a broadcast news network), and a conflicting news may be received via a social media networking site. Accordingly, data segregation layer 205 may rank the verifiable source higher than the social media networking site. However, if the news relates to an announcement by a political leader, then an authenticated social media networking site associated with the political leader may be ranked higher than the verifiable source, such as a broadcast news network. In some embodiments, one or more statistical models may be utilized to rank the one or more sources.

In some embodiments, data segregation layer 205 may be configured to train a machine learning model to rank the one or more sources of data. In some embodiments, the one or more sources may not be a previously known source, or a validated source, or a source that has been previously ranked by data segregation layer 205. Accordingly, a machine learning model may be trained to rank the one or more sources of data. In some embodiments, data segregation layer 205 may be configured to apply probabilistic models to assign validation scores to the one or more sources of data, and a ranking may be determined based on the validation scores.

In some embodiments, data segregation layer 205 may be configured to filter the received data based on a security profile applicable to the computing platform. Enterprise organizations may store confidential information, such as personal information, health related information, and so forth. Accordingly, it may be of significant interest to protect such data, and organizations may generally create security profiles to protect the data, and to protect the enterprise infrastructure from external threats to security. Such security profiles may be organization-wide, at an employee level, and/or at a group or business unit level. In some embodiments, data segregation layer 205 may be configured to establish a firewall around enterprise computing infrastructure 120, and/or encrypt data stored in enterprise data storage platform 130. In some embodiments, data segregation layer 205 may be configured to identify an organization's security profile, and filter the incoming data based on the security profile. For example, a firewall software product may be configured to be tailored to an organizations' security governance needs.

In some embodiments, predictive planning computing platform 110 may include a processing layer 210 that may be configured to generate, for the event, a data structure comprising a plurality of nodes, where determined by the plurality of nodes corresponds to the received data. For example, a relational database (e.g., enterprise data storage platform 130) may be utilized to store, index, and otherwise manage the received data. For example, a technical stack 120b may be configured to include features such as, for example, layer taxonomy, database integration, store configuration files, log files, build model stacks, and/or utilize a virtual environment to store and index the received data. Accordingly, the database (e.g., enterprise data storage platform 130) may be configured to receive data and store the received data at a plurality of nodes. For example, data from news feeds 205c may be stored in a first node associated with a source for broadcast news, a second node associated with a source from a social networking site, and so forth. Also, for example, data associated with an employee 205a may be stored at a node. As another example, different traffic APIs may be associated with nodes in the database.

In some embodiments, data may be received, and predictive planning computing platform 110 may apply security profiles to the nodes. Also, for example, predictive planning computing platform 110 may select nodes based on the event. Associations between events and nodes may be learned based on historical data, and a machine learning algorithm may be trained to identify such associations, and perform predictive analytics for an event based on possible node selections.

In some embodiments, processing layer 210 may be configured to authenticate, by utilizing a distributed ledger-based verification system, the plurality of nodes. For example, in a distributed ledger-based verification system (e.g., based on blockchain technology), a verification process for the data is decentralized. Accordingly, the one or more sources of data may be subjected to a decentralized verification. Generally, predictive planning computing platform 110 may include a dedicated server, a dedicated verification system, and so forth to execute a distributed ledger-based verification system. Also, for example, multiple servers, clusters of servers, cryptocurrency, such as Bitcoin, and/or other factors may be a part of the distributed ledger-based verification system.

However, such distributed ledger-based verification systems may be computationally intensive. For example, it may not be computationally efficient to run a distributed ledger-based verification system on a mobile device, an internet of things (IoT) device, a network router, and so forth. For example, mobile devices may not include a dedicated server, a dedicated verification system, and so forth. Accordingly, in some embodiments, the distributed ledger-based verification system may be based on Holochain technology. The term "Holochain" as used herein, refers to any distributed, peer-to-peer verification application. In some embodiments, a Holochain may be available via a cloud server. Generally, Holochain applications may be versatile, scalable, fast, and efficient. A peer-to-peer interaction allows data to be validated across a plurality of sources, and over time. In some instances, Holochain applications may be available in an open source environment, and may therefore be adaptive and agile to changing needs. Data validated via a Holochain may be more reliable as the verification process may be delinked from business and/or other priorities of a source of the data. Also, for example, cryptocurrencies are optional in Holochain applications.

As data is received from data segregation layer 205, processing layer 210 may store the received data at nodes in the database. For example, if a news item is received from an account on a social networking site, then the news item may be placed at a first node, and the account may be placed at a second node. One or more validation rules may be applied to the first node and the second node. For example, if the news item at the first node is contradictory to another news item from a validated source, then the first node may be ignored, and the data may be assigned a lower validation score. In some embodiments, processing layer 210 may validate the plurality of nodes based on a validation score retrieved from a Holochain verification system. As described herein, different nodes are processed separately, thereby allowing for an in-built objective verification of the nodes, and such verification may be cross-validated across nodes, and sources of data.

In some embodiments, processing layer 210 may be configured to authenticate the plurality of nodes based on the rank determined by data segregation layer 205. For example, as described herein, processing layer 210 may rank the plurality of nodes based on various factors. For example, the plurality of nodes may be ranked based on historical data, a source of the data, time of receipt (e.g., contemporaneous information), and so forth. As described herein, processing layer 210 may validate the plurality of nodes based on a validation score retrieved from a Holochain verification system. Accordingly, the ranking generated by data segregation layer 205 may be cross-validated with the validation score retrieved from a Holochain verification system, and an aggregate score may be determined.

In some embodiments, processing layer 210 may be configured to train a machine learning model to authenticate the plurality of nodes. For example, the machine learning model may be trained to cross-validate the ranking generated by data segregation layer 205 may be cross-validated with the validation score retrieved from a Holochain verification system. Also, for example, the machine learning model may be trained to identify correlations between sources of data and corresponding aggregated rankings. Accordingly, machine learning model may be trained to identify sources that have a higher likelihood of being a trusted source of data.

In some embodiments, processing layer 210 may be configured to perform, based on business rules applicable to the one or more business operations, analytics on the plurality of authenticated nodes. For example, processing layer 210 may be configured to perform analytics 210a, including, for example, analyzing received data stored at a node by applying text mining techniques, knowledge discovery algorithms, context-based text processing techniques, and so forth. In some embodiments, processing layer 210 may be configured to perform such analytics by utilizing thesauri, applying clustering algorithms, applying an ontology, performing semantic processing of data, performing entity extraction, determining relevancy, and so forth.

In some embodiments, predictive planning computing platform 110 may include an application layer 215 that may be configured to generate, based on the analytics, a contingency plan to mitigate the impact to the one or more business operations. For example, application layer 215 may integrate output of the analytics on validated data, apply security governance rules to filter data, determine user impact, and generate a contingency plan.

A "contingency plan" as used herein, may refer to a business continuity plan that enable business operations to continue with minimal disruptions and/or delays, and with minimal or no harm to employees and other personnel. For example, the contingency plan may include one or more steps that may be recommended to mitigate effects of the event. For example, the event may be a building fire, and the contingency may be a manner in which employees may be evacuated from a building on fire. As another example, the event may be a flood, and the contingency plan may provide employees information on traffic patterns and provide real-time recommendations for alternate routes. As another example, an event may have happened overnight (e.g., floods, tornado, snowstorm, riots, and so forth), and the contingency plan may inform employees to work from home. Also, for example, the event may be riots in a neighborhood of an office building, and the contingency plan may provide employees information on nearby emergency services, and overnight, safe accommodation.

In some embodiments, application layer 215 may be configured to determine a severity level associated with the event, and where the contingency plan is based on the severity level. For example, an event may be associated with a severity level. An event that is forecast to take place in a week may be less severe than an event that is forecast to occur within a day. As another example, an active event, such as, a real-time traffic situation, ongoing floods with heavy rainfall, or an ongoing fire, security incident, riot, protest, and so forth may be associated with a higher severity level, whereas an event comprising a visit by a political leader or an executive may be associated with a lower severity level. In some embodiments, the severity level may be an alert level issued by a government agency. In some embodiments, the severity level may be a threat level issued by a weather tracking agency.

Accordingly, the contingency plan may be based on the severity level. For example, if a threat is imminent, making the severity level to be high, application layer 215 may be configured to formulate a contingency plan within a time threshold, and provide it to affected parties. For example, if a building is on fire, application layer 215 may be configured to identify safe evacuation routes, nearby stairwells, determine if it may be safer to direct personnel to the roof of the building, or guide them to the first floor. Such, and other information, may be provided in real-time, with customized steps for individuals based on their location attributes, health attributes, and via mobile devices, and so forth. In such instances, response time and safety considerations may be prioritized over time taken to generate and/or implement the plan, resources available, and other considerations. On the other hand, if the event is associated with a lower severity level, application layer 215 may be configured to respond over a longer time, be sensitive to associated resource allocations, provide a more comprehensive strategy, provide multiple options, and so forth.

In some embodiments, application layer 215 may be configured to train a machine learning model to determine the severity level. For example, the machine learning model may be trained to learn from historical data to determine a severity level for an event. For example, if an office and employees are located in a suburban area, then a political unrest in the suburban area may be associated with a higher severity level. However, a political unrest in the downtown area may be associated with a lower severity level. Accordingly, the machine learning model may be trained to identify a location and type of enterprise resources (e.g., buildings, personnel, infrastructure, and so forth), city data, data from LiDAR, weather and traffic information, and correlate such information with received information about the event, to determine the severity level.

In some embodiments, application layer 215 may be configured to receive additional data from a trusted source. For example, based on data received from data segregation layer 205 and validated by processing layer, predictive planning computing platform 110 may determine a contingency plan. However, additional information from an additional source 215a may be received. In some embodiments, the additional source 215a may be a trusted source. For example, received data may indicate that flood waters may be a few blocks away, and a first set of contingency plans may have been generated based on such information. However, a security guard positioned outside an office building may witness water gushing into the street where the building is located. Accordingly, the security guard may be the trusted source, and based on such verification, the first set of contingency plans may be replaced with an updated set of contingency plans. Also, for example, a severity level for the event may be elevated.

In some embodiments, application layer 215 may be configured to update, based on the trusted source, a ranking of the one or more sources of data. For example, when more reliable information is received from a trusted source, and such information contradicts previously received information, application layer 215 may be configured to adjust the rankings of the plurality of nodes associated with the event, and/or the information. In the preceding example, when the security guard provides an updated information about the flood waters, application layer 215 may review the one or more sources of data that previously indicated that the flood waters may be a few blocks away. Accordingly, application layer 215 may lower a ranking of the one or more identified sources of data.

In some embodiments, predictive planning computing platform 110 may include a user interface layer 220 that may configure an interactive graphical user interface. For example, user interface layer 220 may include a geospatial intelligent planner (GIP) 220a and a map presentation interface 220b. In some embodiments, an enterprise personnel may be provided the generated contingency plan for review and validation. For example, a dashboard may be presented and the contingency plan may be validated. In some embodiments, user interface layer 220 may configure user interfaces to provide information about an affected area, provide navigational aid, provide information on hot spots, safe havens, evacuation routes, location information for nearby medical facilities and/or emergency services, information about a safety protocol, alerts, and so forth.

In some embodiments, prediction layer 225 may be configured to cause, based on the contingency plan, a deployment of resources. For example, personnel, equipment, and so forth, may be deployed. For example, employees at an office building may be evacuated to an identified safe haven, and/or provided with overnight accommodation. Also, for example, company equipment, vehicles, and so forth, may be moved to a safer location.

In some embodiments, processing layer 210 may be configured to evaluate the deployment of the resources for effectiveness in mitigating the impact to the one or more business operations. For example, upon implementation of the contingency plan, a feedback loop may be implemented to determine an effectiveness of the contingency plan. In some embodiments, virtual simulations of the contingency plan may be run (e.g., 50-60 simulations) to validate the plan. When the plan is implemented in real-time, the execution may be compared to the simulated plans to determine how well the simulated plan was able to mimic real-time events. Based on such feedback, the contingency plan may be associated with a validation score. For example, when a real-time implementation is within a threshold of a virtual simulation, the contingency plan may be associated with a validation score indicative of high effectiveness. Also, for example, when a real-time implementation is outside a threshold of a virtual simulation, the contingency plan may be associated with a validation score indicative of low effectiveness. In some embodiments, the validation score for the contingency plan may be a score on a scale from 1 to 10, where "1" may be indicative of low effectiveness, and "10" may be indicative of high effectiveness.

In some embodiments, processing layer 210 may be configured to train a machine learning model to perform, based on the evaluating, one or more of a filtering of the received data or the authenticating of the plurality of nodes. For example, the contingency plan may be utilized as training data in supervised machine learning. For example, upon review and/or validation, the contingency may become labeled data for the supervised learning algorithm. For example, a contingency plan may be associated with an event and data received. For a contingency plan associated with a validation score indicative of high effectiveness, predictive planning computing platform 110 may use reinforced learning techniques to associate the contingency plan with a positive reinforcement. On the other hand, for a contingency plan associated with a validation score indicative of low effectiveness, predictive planning computing platform 110 may use reinforced learning techniques to associate the contingency plan with a negative reinforcement.

In some embodiments, predictive planning computing platform 110 may include a prediction layer 225 that may be configured to provide, via the interactive graphical user interface, the contingency plan. For example, prediction layer 225 may provide information about an affected area, provide navigational aid, provide information on hot spots, safe havens, evacuation routes, location information for nearby medical facilities and/or emergency services, information about a safety protocol, alerts, information about office openings and closures, and so forth.

In some embodiments, prediction layer 225 may be configured to generate, based on the analytics, one or more recommended steps to mitigate the impact to the one or more business operations. For example, the one or more recommended steps may include an alternate route for an employee. In some examples, the one or more recommended steps may include step-by-step instructions to navigate a real-time security threat or a fire hazard. Also, for example, the one or more recommended steps may include instructions about emergency preparedness procedures. As another example, the one or more recommended steps may include instructions about alternative accommodations.

In some embodiments, prediction layer 225 may be configured to train a machine learning model to predict the contingency plan based on historical data. As described herein, predictive planning computing platform 110 may generate, in real-time, a business continuity plan in response to an event. Also, predictive planning computing platform 110 may generate a business continuity plan for an event that may be likely to occur, based on historical data. For example, historical data may indicate that, for a geographic location, heavy rains during the months of July through September cause extensive flooding. Also, for example, based on historical data (e.g., image data from previous years), a machine learning model may determine geographical areas that may be affected, determine associated disruptions to traffic, detect patterns in how the areas are progressively affected, a duration of time, and so forth. Also, for example, based on previously implemented contingency plans, the machine learning model may identify one or more aspects of the previous plans that were successful. Accordingly, prediction layer 225 may be configured to train the machine learning model to predict the contingency plan based on such information.

In some embodiments, prediction layer 225 may be configured to monitor, via the graphical user interface, interactions with the contingency plan, and filter the received data based on the monitoring. For example, an enterprise user may review one or more aspects of a proposed contingency plan, and may determine that weather data has not been utilized. Accordingly, prediction layer 225 may be configured to filter the received data to allow for weather data to be a part of the planning. As another example, based on the event, the enterprise user may review one or more aspects of a proposed contingency plan, and may determine that the event is expected to occur on a weekend, and accordingly, employee data need not be utilized. Accordingly, prediction layer 225 may be configured to filter the received data to remove employee data as a part of the planning.

In some embodiments, prediction layer 225 may be configured to train a machine learning model to perform the filtering based on the monitoring. As described herein, a machine learning model may receive as input labeled data indicating a type of data that may be utilized for certain events, and correlate such events with an organization's location, a time of day, a type of weather, and so forth. For example, upon receiving the labeled data indicating that employee data may not be a factor when a weather event occurs over a weekend, the machine learning model may learn to retrieve information related to work hours, holidays, weekends, and so forth, to identify when to use employee data for an event. In some embodiments, the machine learning model may customize the filtering based on an individual's vacation time, and so forth, or if the individual may be a remote worker.

Figure 3:
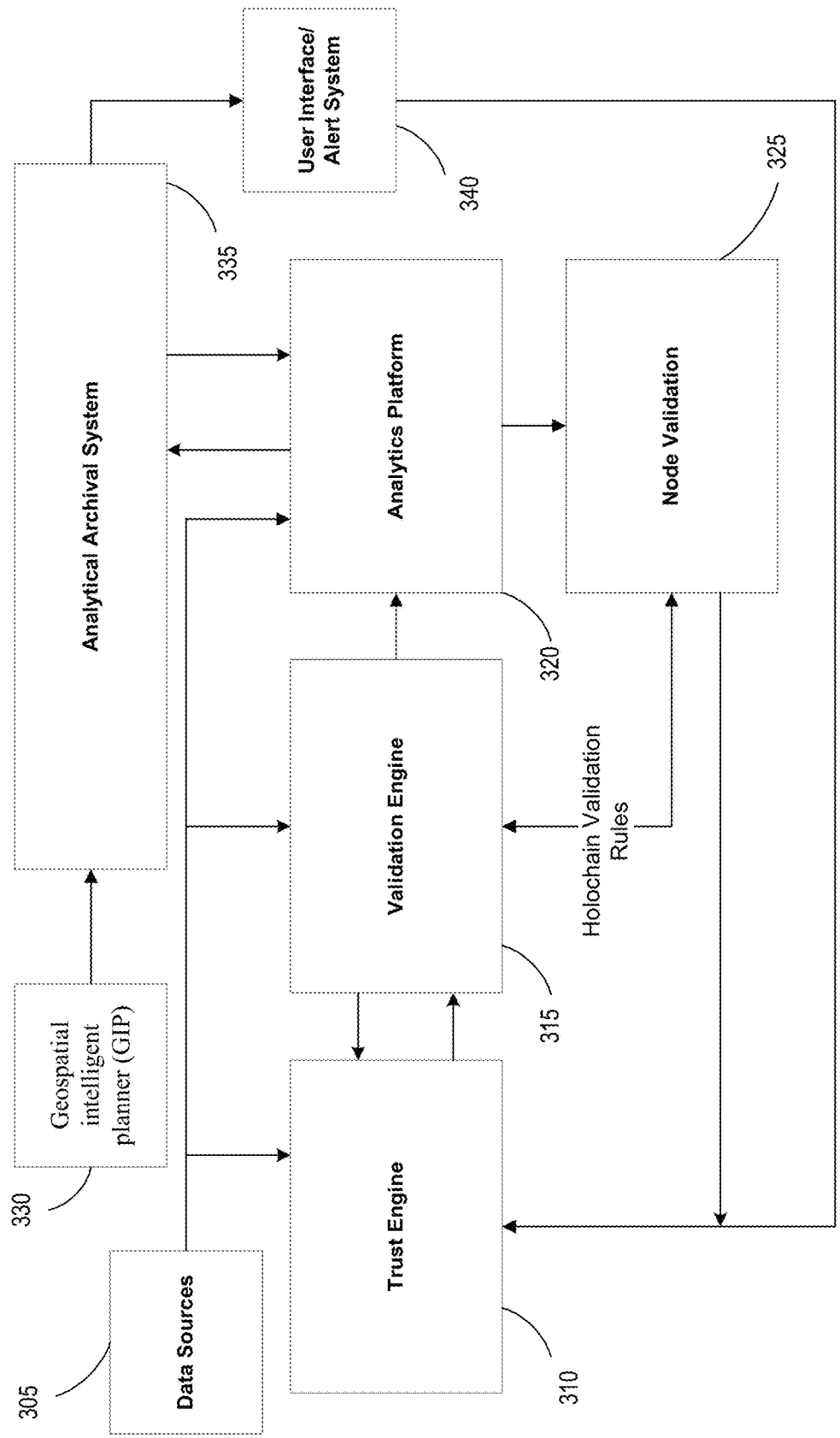
FIG. 3 depicts an illustrative block diagram for a machine learning based decentralized business planning system.

FIG. 3 depicts an illustrative block diagram for a machine learning based decentralized business planning system. One or more sources of data 305 may provide information about employees, traffic, weather, topography, transportation, emergency services, and so forth. In some embodiments, data sources 305 may share one or more attributes of data segregation layer 205. Such data may be accessed by trust engine 310 that may filter data based on a security profile for the organization. For example, trust engine 310 may align data with corporate security protocols prevent unauthorized content, and/or access. In some embodiments, trust engine 310 may share one or more attributes of security governance performed by data segregation layer 205, and/or application layer 215.

Data from data sources 305 may be provided to validation engine 315, which may validate the received data. In some embodiments, validation engine 315 may share one or more attributes of processing layer 205, and/or application layer 215. In some embodiments, such information about data validation may be communicated to trust engine 310. In some embodiments, data filtered by trust engine 310 may be communicated to validation engine 315 for validation. Such exchanges may occur iteratively to optimize a type of data to be utilized for analytics, and/or for the contingency planning. Validation engine 315 may validate new data, store data in a new chain entity, add data to a Holochain, index content in a database, share data with node validation 325, and/or respond to validation requests from node validation 325.

Filtered data, validated data, and/or raw data (e.g., not filtered, or validated), may be provided to analytics platform 320. Analytics platform 320 may perform analytics on the received data, and provide results of the analytics to an analytical archival system 335. In some embodiments, analytics platform 320 may share one or more attributes of analytics 210a performed by processing layer 205. Generally, analytical archival system 335 may be a repository of data analytics, data from machine learning models, a repository of historical data, a repository of previously generated contingency plans, and so forth. In some embodiments, analytical archival system 335 may share one or more attributes of technical stack 210b performed by processing layer 205. Geospatial intelligent planner (GIP) 330 may provide further input and insights to train the data from analytics platform 320 to generate labeled data for machine learning models. In some embodiments, analytical archival system 335 may provide insights and information to analytics platform 320 to enhance training accuracy of one or more machine learning models, as described herein. In some embodiments, GIP 330 may share one or more attributes of GIP user interface 220a of user interface layer 220.

In some embodiments, data from analytics platform 320 may be provided to node validation 325, that validates nodes in the database based a distributed verification system, such as based on Holochain technology. Content from received data may be addressed via a cryptographic address. By applying a Holochain technology, metadata for the content may be associated with information about a person, entity, and so forth (e.g., transactions performed, posts to social networking sites), and with data elements (e.g., tags, comments, ratings). In some embodiments, validated data from node validation 325 may be provided to trust engine 310 as part of a feedback mechanism to optimize selection and/or filtering of received data.

Output of analytical archival system 335 may be provided to user interface/alert system 340. In some embodiments, user interface/alert system 340 may share one or more attributes of user interface layer 220, and/or prediction layer 225. As described herein, a contingency plan generated by user interface/alert system 340 may be provided to trust engine 310 to optimize compliance with a security profile of the organization. Also, for example, trust engine 310 may receive feedback from user interface/alert system 340 to modify firewalls. In some embodiments, this provides a feedback loop where additional data may be filtered in, or filtered out, and the process may proceed through another iteration of validation, analytics, and so forth, to generate an updated contingency plan. In some embodiments, user interface/alert system 340 may provide feedback to trust engine 310, indicating feedback from user interaction with a contingency plan. Such a feedback loop may be a part of reinforced learning models.

Figure 4:
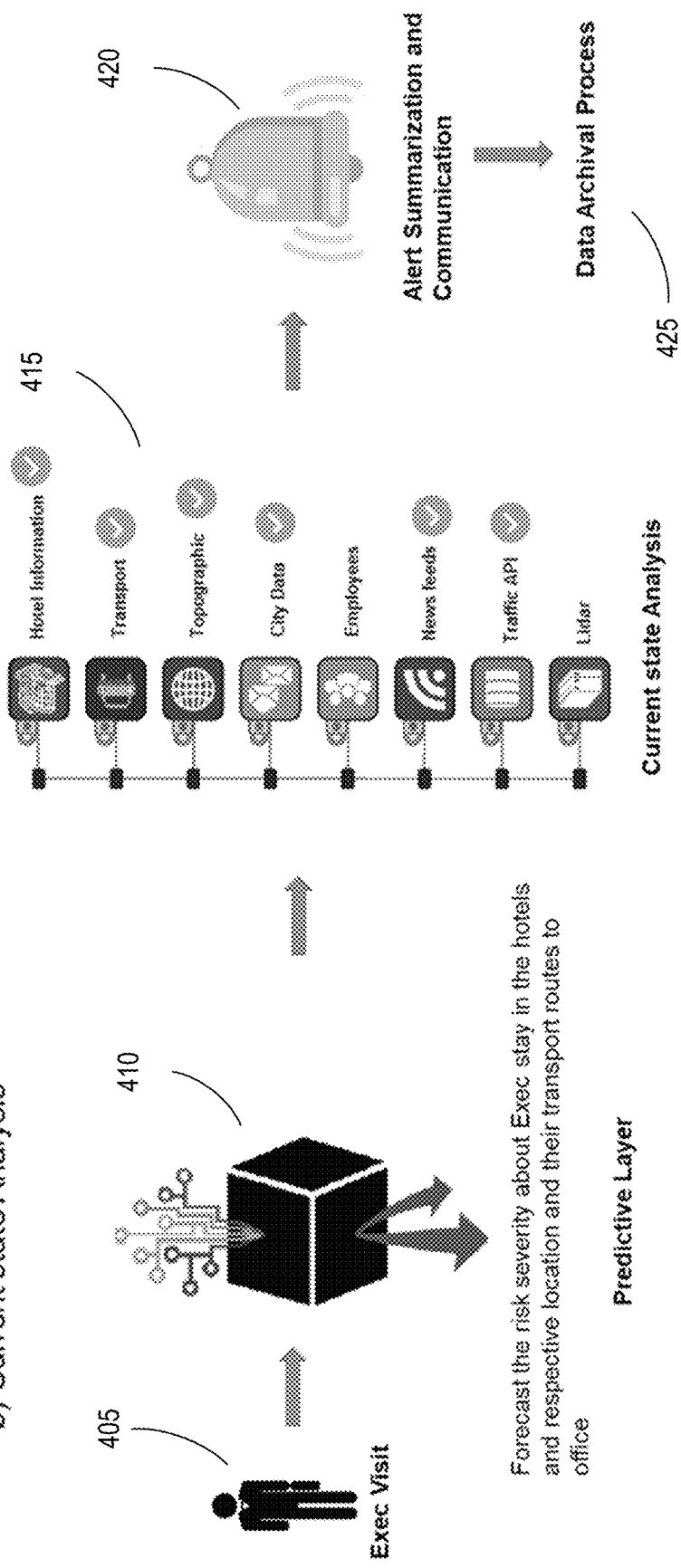
FIG. 4 depicts an illustrative example for a machine learning based decentralized business planning system.

FIG. 4 depicts an illustrative example for a machine learning based decentralized business planning system. A company executive 405 may be planning to visit an office location. During the visit, executive 405 may stay at a hotel. Before executive 405 arrives, predictive layer 410 may be applied. A severity level may be determined for the hotel where he may stay, his travel route (e.g., from the airport to the hotel), historical data about location and route may be analyzed, and a severity level may be determined. Upon arrival of executive 405 at the airport, there may be an unforeseen political unrest in the city. Accordingly, a contingency plan may be generated to ensure safety of executive 405. In performing a current state analysis 415, as part of filtering the data, specific data (illustrated with checked marks) may be included. For example, data related to hotel information, transportation, topography, city information, data from news feeds, data from traffic APIs, and LiDAR data may be incorporated into predictive planning computing platform 110. As employees are generally not affected by travel plans for executive 405, employee data may be filtered out of consideration. Holochain technology may be applied to validate the data, and a severity level may be determined. A contingency plan, including alert notifications 420 may be generated, and provided. For example, recommendations may be provided to security personnel responsible for secured transportation of executive 405. Also, for example, alerts and notifications 420 may be stored in a repository or data archival system 425. As illustrated in this example, predictive planning computing platform 110 may apply a combination of predictive planning and current state analysis to provide an effective contingency plan.

Figure 5:
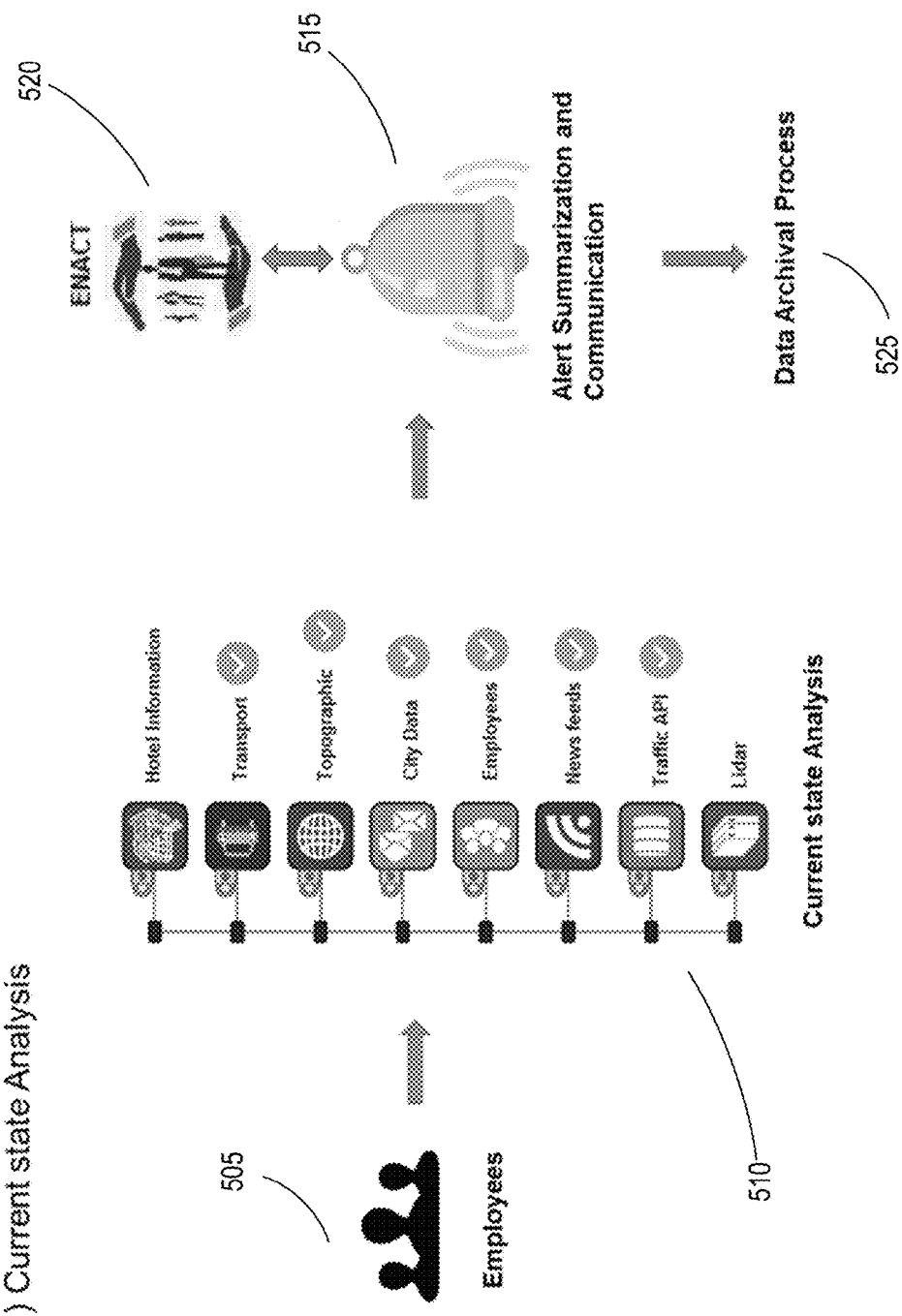
FIG. 5 depicts another illustrative example for a machine learning based decentralized business planning system.

FIG. 5 depicts another illustrative example for a machine learning based decentralized business planning system. In some examples, there may not be a predictive planning, but there may only be a current state assessment. For example, there may be a sudden riot in a city. Corporate security teams may need to assess a rapidly evolving situation in real-time, and implement contingency plans to ensure safety of employees 505. As part of current state analysis 510, hotel information and LiDAR data may not be useful; however, information related to transportation, topography, city information, employees, data from news feeds, data from traffic APIs, may be incorporated into predictive planning computing platform 110. Holochain technology may be applied to validate the data, and a severity level may be determined. A contingency plan, including alert notifications 515 may be generated, and provided. For example, actionable recommendations 520 may be provided to employees 505. Also, for example, alerts and notifications 515 may be stored in a repository or data archival system 525. As illustrated in this example, predictive planning computing platform 110 may apply current state analysis, without performing predictive planning, to provide an effective contingency plan.

Figure 6:
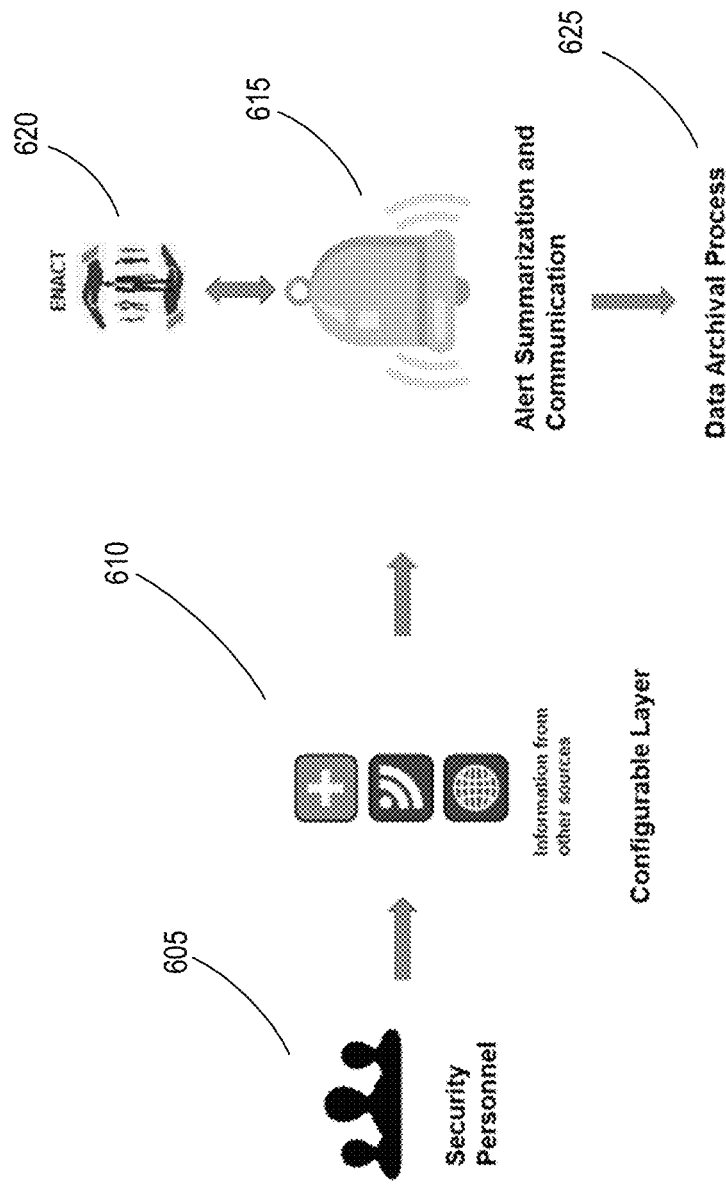
FIG. 6 depicts another illustrative example for a machine learning based decentralized business planning system.

FIG. 6 depicts another illustrative example for a machine learning based decentralized business planning system. As this example illustrates, additional data from a trusted source may be used to override data received from the one or more sources. As illustrated, security personnel 605 may be a trusted source of information, such as, for example, an eyewitness account of an evolving event. Accordingly, such additional information may be incorporated in configurable layer 610. Such information may override information based on data validated by Holochain technology. In some embodiments, such information from a trusted source may confirm information from a validate source, and/or validated data. Accordingly, a ranking of a node associated with the validated data may be increased, based on confirmation from a trusted source. A contingency plan, including alert notifications 615 may be generated, and provided. In some embodiments, a previous contingency plan may be updated based on the additional information. For example, actionable recommendations 620 may be provided. Also, for example, alerts and notifications 615 may be stored in a repository or data archival system 625. As illustrated in this example, predictive planning computing platform 110 may apply current state analysis, without performing predictive planning, and override received data when data from a trusted source is available.

Figure 7:
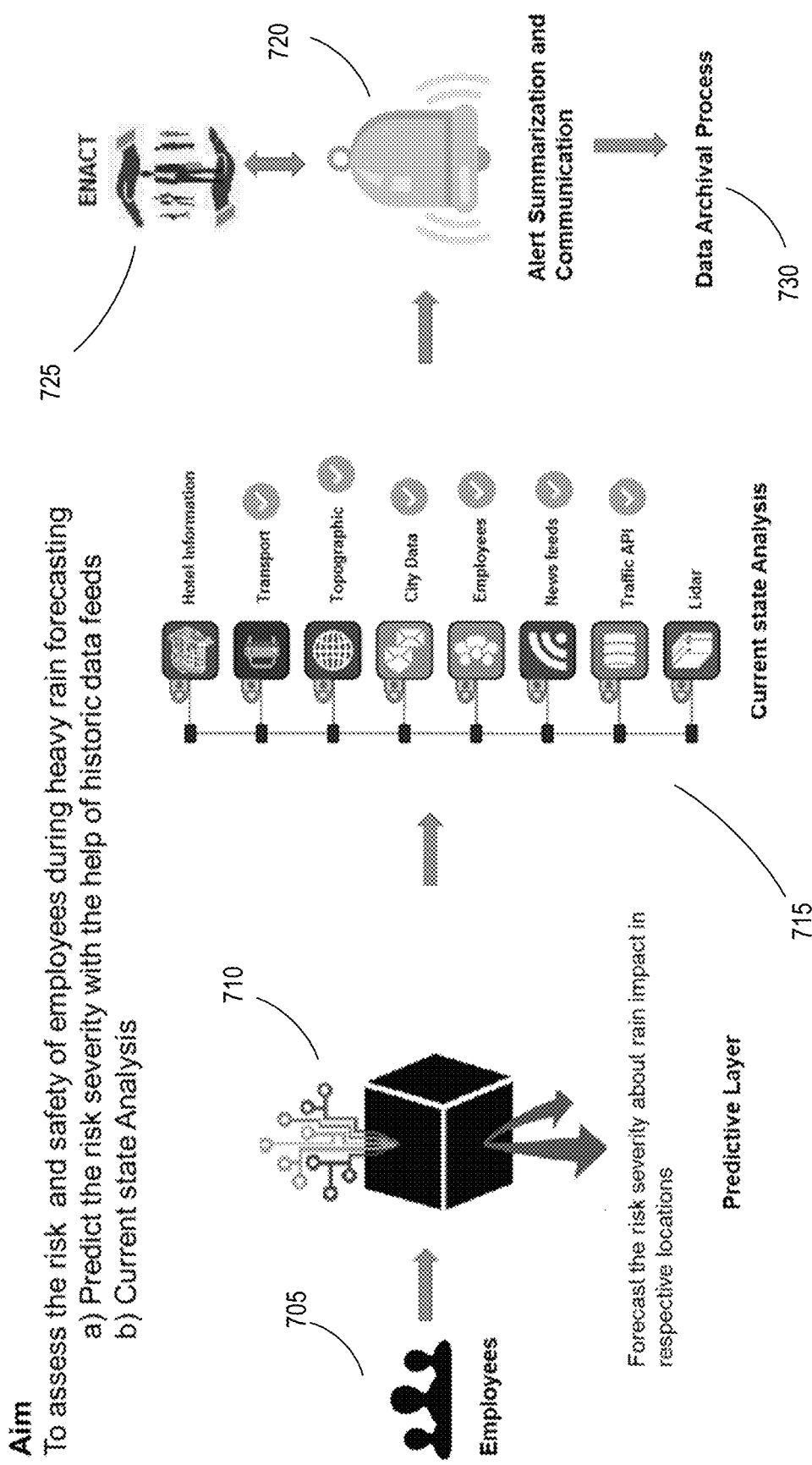
FIG. 7 depicts another illustrative example for a machine learning based decentralized business planning system.

FIG. 7 depicts another illustrative example for a machine learning based decentralized business planning system. In some examples, predictive planning may be supplemented a current state assessment. For example, based on historical data, a seasonal weather pattern (e.g., heavy snow, heavy rainfall, hurricane) may be known to occur. Corporate security teams may need to assess the situation, and proactively implement contingency plans to ensure business continuity, and safety of employees 705. As part of predictive layer 710, a severity level for an impact from the weather event may be determined, and forecast contingency plan. At the time the weather event takes place, current state analysis 715 may be performed, and it may be determined that hotel information and LiDAR data may not be useful; however, information related to transportation, topography, city information, employees, data from news feeds, data from traffic APIs, may be incorporated into predictive planning computing platform 110. Holochain technology may be applied to validate the data, and a severity level may be determined. The forecast contingency plan may be supplemented with an outcome of current state analysis 715, including alert notifications 720 that may be generated, and provided. For example, actionable recommendations 725 may be provided to employees 705. Also, for example, alerts and notifications 720 may be stored in a repository or data archival system 730.

Figure 8:
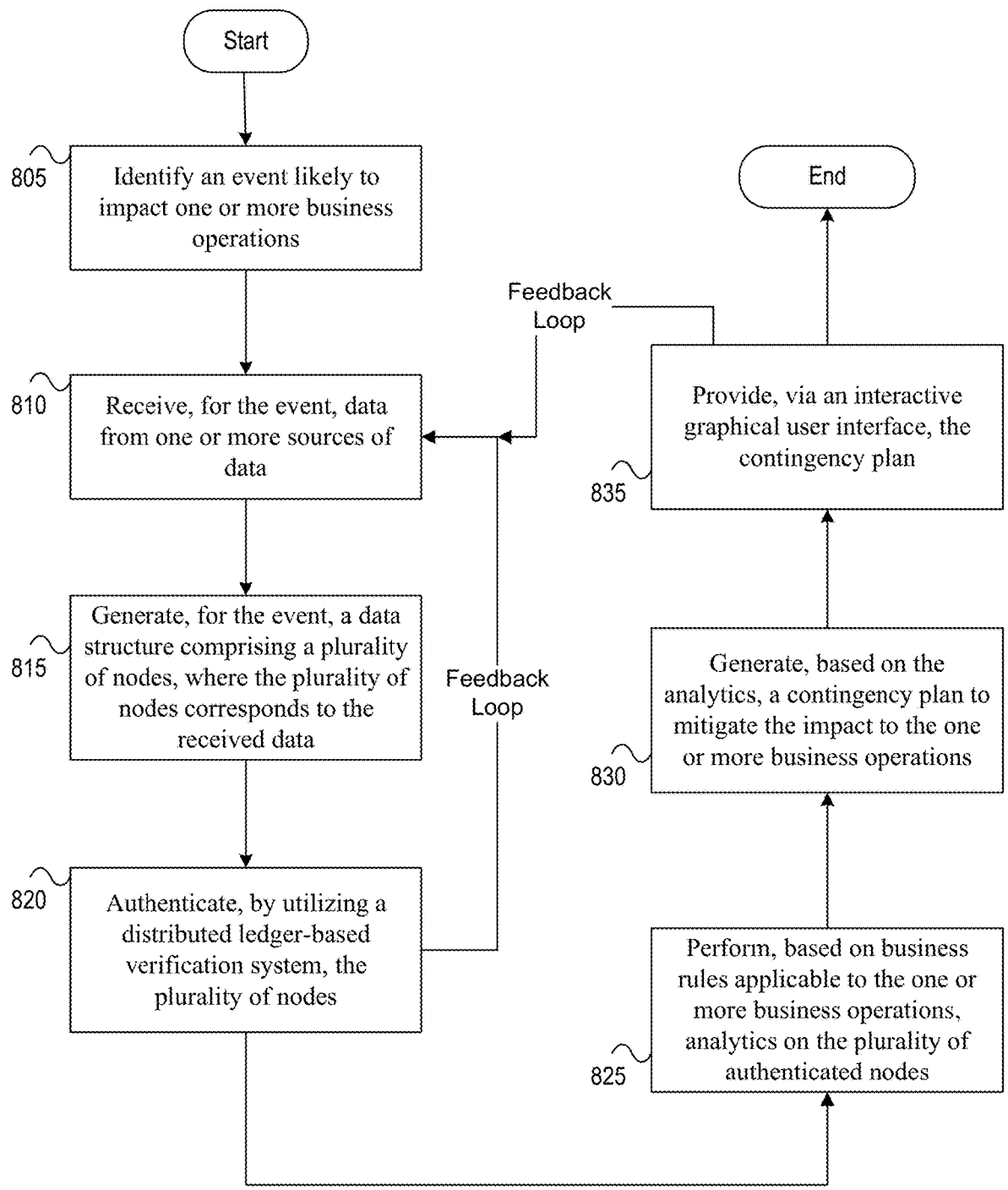
FIG. 8 depicts an illustrative method for a machine learning based decentralized business planning system.

FIG. 8 depicts an illustrative method for a machine learning based decentralized business planning system. Referring to FIG. 8, at step 805, a computing platform having at least one processor, and memory may identify an event likely to impact one or more business operations. At step 810, the computing platform may receive, for the event, data from one or more sources of data. At step 815, the computing platform may generate, for the event, a data structure comprising a plurality of nodes, wherein the plurality of nodes corresponds to the received data. At step 820, the computing platform may authenticate, by utilizing a distributed ledger-based verification system, the plurality of nodes. In some embodiments, the process may return to step 810 to retrieve additional data from the one or more sources of data.

At step 825, the computing platform may perform, based on business rules applicable to the one or more business operations, analytics on the plurality of authenticated nodes. At step 830, the computing platform may generate, based on the analytics, a contingency plan to mitigate the impact to the one or more business operations. At step 835, the computing platform may provide, via an interactive graphical user interface, the contingency plan. In some embodiments, the process may return to step 810 to retrieve additional data from the one or more sources of data.

Figure 9:
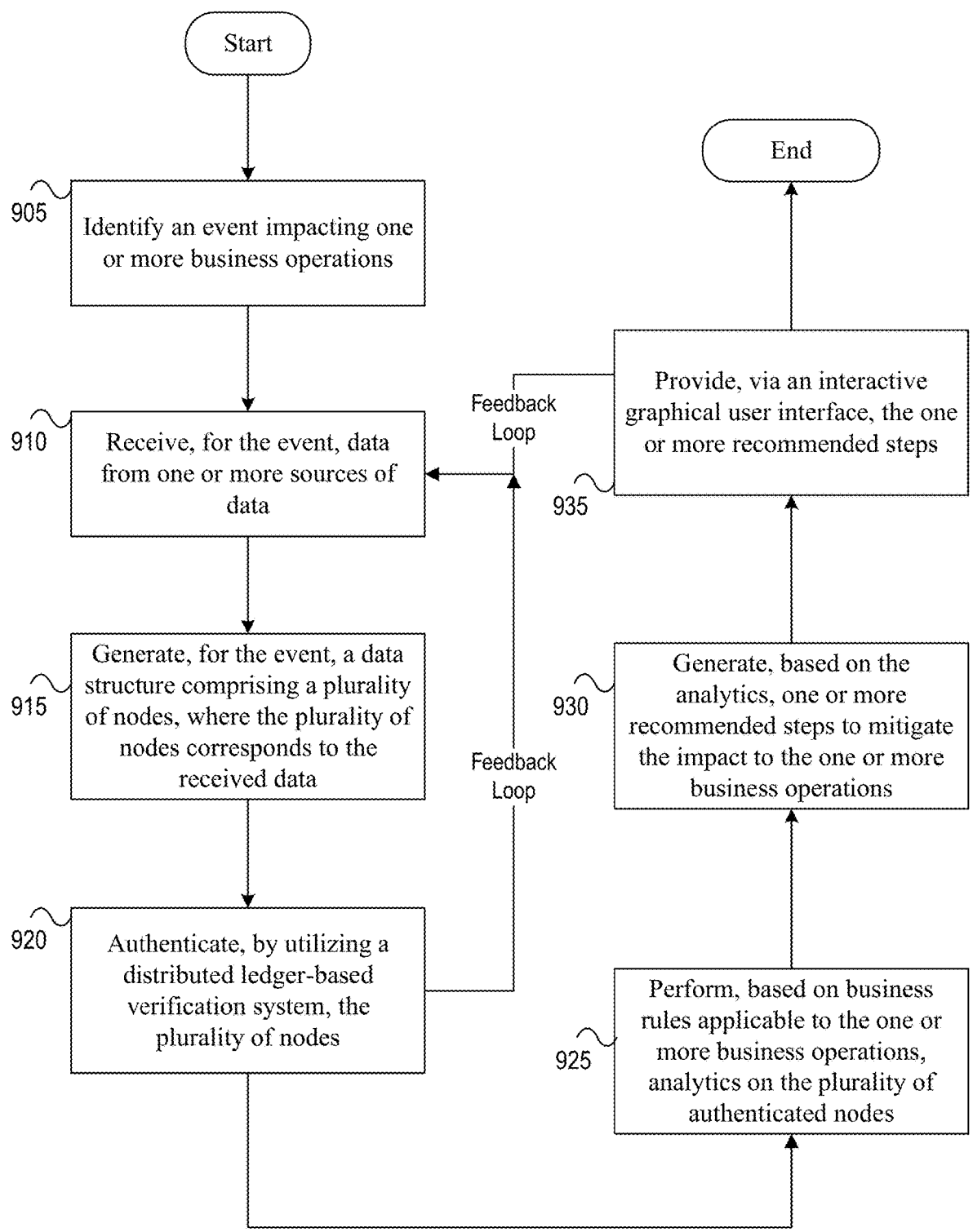
FIG. 9 depicts another illustrative method for a machine learning based decentralized business planning system.

FIG. 9 depicts another illustrative method for a machine learning based decentralized business planning system.

Referring to FIG. 9, at step 905, a computing platform having at least one processor, and memory may identify an event likely to impact one or more business operations. At step 910, the computing platform may receive, for the event, data from one or more sources of data. At step 915, the computing platform may generate, for the event, a data structure comprising a plurality of nodes, wherein the plurality of nodes corresponds to the received data. At step 920, the computing platform may authenticate, by utilizing a distributed ledger-based verification system, the plurality of nodes. In some embodiments, the process may return to step 910 to retrieve additional data from the one or more sources of data.

At step 925, the computing platform may perform, based on business rules applicable to the one or more business operations, analytics on the plurality of authenticated nodes. At step 930, the computing platform may generate, based on the analytics, one or more recommended steps to mitigate the impact to the one or more business operations. At step 935, the computing platform may provide, via an interactive graphical user interface, the one or more recommended steps. In some embodiments, the process may return to step 910 to retrieve additional data from the one or more sources of data.

Figure 10:
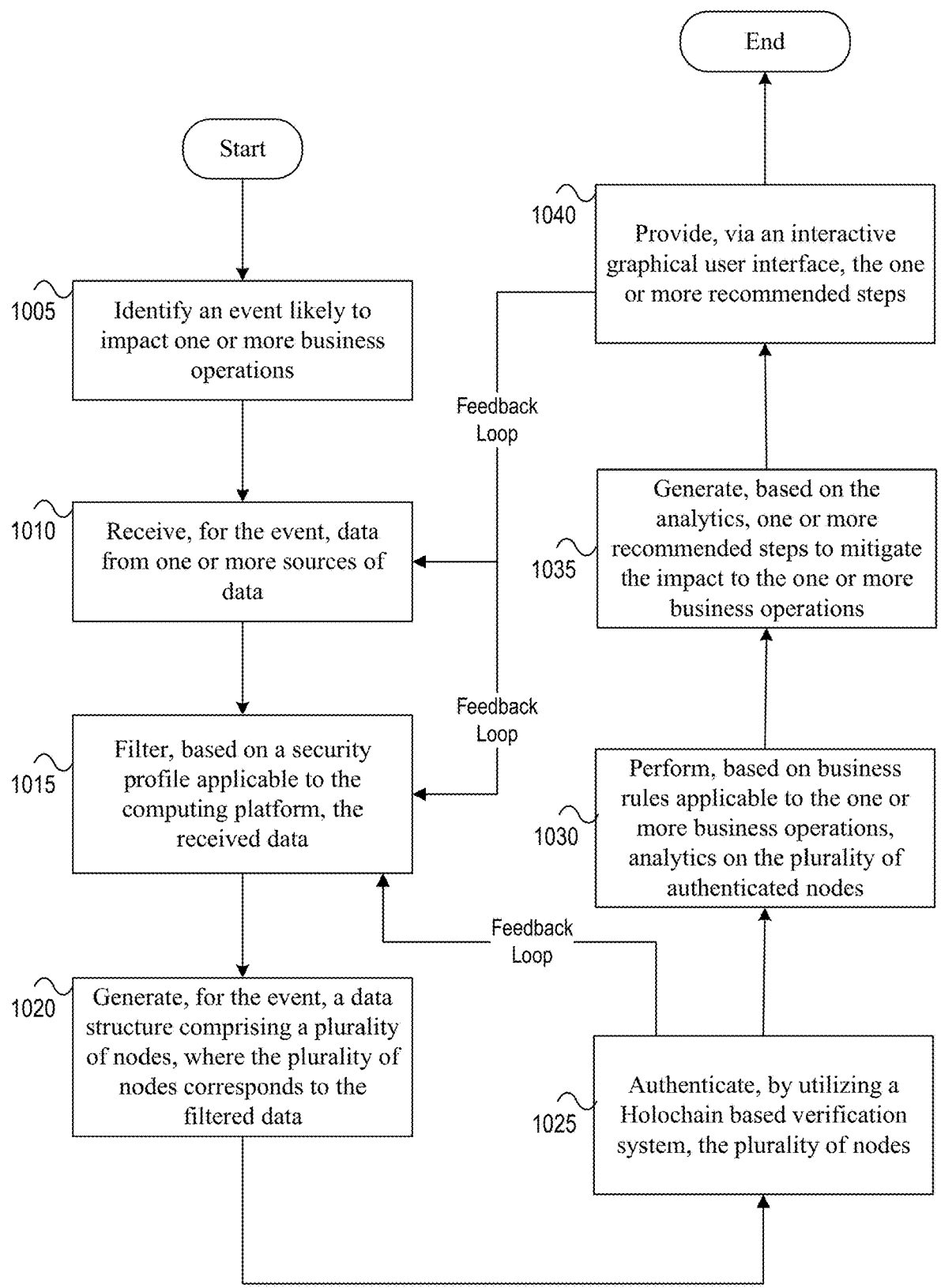
FIG. 10 depicts another illustrative method for a machine learning based decentralized business planning system.

FIG. 10 depicts another illustrative method for a machine learning based decentralized business planning system. Referring to FIG. 10, at step 1005, a computing platform having at least one processor, and memory may identify an event likely to impact one or more business operations. At step 1010, the computing platform may receive, for the event, data from one or more sources of data. At step 1015, the computing platform may filter, based on a security profile applicable to the computing platform, the received data. At step 1020, the computing platform may generate, for the event, a data structure comprising a plurality of nodes, wherein the plurality of nodes corresponds to the filtered data. At step 1025, the computing platform may authenticate, by utilizing a Holochain based verification system, the plurality of nodes. In some embodiments, the process may return to step 1015 to filter the received data.

At step 1030, the computing platform may perform, based on the rank and business rules applicable to the one or more business operations, analytics on the plurality of authenticated nodes. At step 1035, the computing platform may generate, based on the analytics, one or more recommended steps to mitigate the impact to the one or more business operations. At step 1040, the computing platform may provide, via an interactive graphical user interface, the one or more recommended steps. In some embodiments, the process may return to step 1010 to receive additional data from the one or more sources of data. In some embodiments, the process may return to step 1015 to filter the received data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   identify an event likely to impact one or more business operations;
   receive, for the event, data from one or more sources of data;
   generate, for the event, a data structure comprising a plurality of nodes, wherein the plurality of nodes corresponds to the received data; authenticate, by utilizing a distributed ledger-based peer-to-peer verification system, the plurality of nodes, the distributed ledger-based peer-to-peer verification system executing on a cloud server;
   perform, based on business rules applicable to the one or more business operations, analytics on the plurality of authenticated nodes;
   train a machine learning model to predict a contingency plan based on historical data;
   generate, based on the analytics and the machine learning model, the contingency plan to mitigate the impact to the one or more business operations;
   provide, via an interactive graphical user interface, the contingency plan; and
   execute a feedback loop to determine an effectiveness of the contingency plan,
   executing the feedback loop including:
   executing a plurality of virtual simulations of the contingency plan;
   after executing the contingency plan in real-time, compare the execution of the contingency plan to the plurality of virtual simulations; and
   based on the comparing, generating a validation score indicating effectiveness of the contingency plan.

2. The computing platform of claim 1, wherein the instructions comprise additional computer-readable instructions that, when executed by the at least one processor, cause the computing platform to:
   rank, in real-time and based on a statistical model, the one or more sources of data, and
   wherein the authenticating is based on the rank.

3. The computing platform of claim 1, wherein the instructions comprise additional computer-readable instructions that, when executed by the at least one processor, cause the computing platform to:
   select, based on the event, the one or more sources of data.

4. The computing platform of claim 1, wherein the instructions comprise additional computer-readable instructions that, when executed by the at least one processor, cause the computing platform to:
   train a machine learning model to authenticate the plurality of nodes.

5. The computing platform of claim 1, wherein the instructions comprise additional computer-readable instructions that, when executed by the at least one processor, cause the computing platform to:
   train a machine learning model to rank the one or more sources of data.

6. The computing platform of claim 1, wherein the instructions comprise additional computer-readable instructions that, when executed by the at least one processor, cause the computing platform to:
   determine a severity level associated with the event, and
   wherein the contingency plan is based on the severity level.

7. The computing platform of claim 6, wherein the instructions comprise additional computer-readable instructions that, when executed by the at least one processor, cause the computing platform to:
   train a machine learning model to determine the severity level.

8. The computing platform of claim 1, wherein the instructions comprise additional computer-readable instructions that, when executed by the at least one processor, cause the computing platform to:
  filter the received data based on a security profile applicable to the computing platform.

9. The computing platform of claim 8, wherein the instructions comprise additional computer-readable instructions that, when executed by the at least one processor, cause the computing platform to:
  monitor, via the graphical user interface, interactions with the contingency plan, and
  wherein the filtering is based on the monitoring.

10. The computing platform of claim 9, wherein the instructions comprise additional computer-readable instructions that, when executed by the at least one processor, cause the computing platform to:
  train a machine learning model to perform the filtering based on the monitoring.

11. The computing platform of claim 1, wherein the one or more sources of data comprise a Light Detection and Ranging Technology (LiDAR), a traffic application programming interface (API), a news feed, employee information, location data, topographical data, modes of transport, or available accommodations.

12. The computing platform of claim 1, wherein the instructions comprise additional computer-readable instructions that, when executed by the at least one processor, cause the computing platform to:
  receive additional data from a trusted source; and
  update, based on the trusted source, a ranking of the one or more sources of data.

13. The computing platform of claim 1, wherein the instructions comprise additional computer-readable instructions that, when executed by the at least one processor, cause the computing platform to:
  cause, based on the contingency plan, a deployment of resources; and
  evaluate the deployment of the resources for effectiveness in mitigating the impact to the one or more business operations.

14. The computing platform of claim 13, wherein the instructions comprise additional computer-readable instructions that, when executed by the at least one processor, cause the computing platform to:
  train a machine learning model to perform, based on the evaluating, one or more of a filtering of the received data or the authenticating of the plurality of nodes.

15. The computing platform of claim 1, wherein performing the analytics is based on one or more of: content from a thesaurus, clustering techniques, content from an ontology, semantic processing techniques, entity extraction techniques, and relevancy.

16. The computing platform of claim 1, wherein the distributed ledger-based peer-to-peer verification system is based on Holochain technology.

17. A method, comprising:
  at a computing platform comprising at least one processor, and memory:
  identifying an event impacting one or more business operations;
  receiving, for the event, data from one or more sources of data;
  generating, for the event, a data structure comprising a plurality of nodes, wherein the plurality of nodes corresponds to the received data;
  authenticating, by utilizing a distributed ledger-based peer-to-peer verification system, the plurality of nodes, the distributed ledger-based peer-to-peer verification system executing on a cloud server;
  performing, based on business rules applicable to the one or more business operations, analytics on the plurality of authenticated nodes;
  training a machine learning model to predict a contingency plan including one or more steps to mitigate the impact to the one or more business operations based on historical data;
  generating, based on the analytics and the machine learning model, the one or more recommended steps to mitigate the impact to the one or more business operations; and
  providing, via an interactive graphical user interface, the one or more recommended steps; and
  execute a feedback loop to determine an effectiveness of the contingency plan, executing the feedback loop including:
  executing a plurality of virtual simulations of the contingency plan;
  after executing the contingency plan in real-time, compare the execution of the contingency plan to the plurality of virtual simulations; and
  based on the comparing, generating a validation score indicating effectiveness of the contingency plan.

18. The method of claim 17, further comprising:
  training a machine learning model to perform one or more of: filtering the received data, ranking the one or more sources of data, authenticating the plurality of nodes, generating the one or more recommended steps, and predicting the contingency plan for a future event based on historical data.

19. One or more non-transitory computer-readable media storing instructions that, when executed by a computing platform comprising at least one processor, and memory, cause the computing platform to:
  identify an event likely to impact one or more business operations;
  receive, for the event, data from one or more sources of data;
  filter, based on a security profile applicable to the computing platform, the received data;
  generate, for the event, a data structure comprising a plurality of nodes, wherein the plurality of nodes corresponds to the filtered data;
  authenticate, by utilizing a Holochain based verification system executing on a cloud server, the plurality of nodes;
  perform, based on a rank and business rules applicable to the one or more business operations, analytics on the plurality of authenticated nodes;
  train a machine learning model to predict a contingency plan including one or more recommended steps to mitigate the impact to the one or more business operations based on historical data;
  generate, based on the analytics and the machine learning model, the one or more recommended steps to mitigate the impact to the one or more business operations; and
  provide, via an interactive graphical user interface, the one or more recommended steps; and
  execute a feedback loop to determine an effectiveness of the contingency plan, executing the feedback loop including;
  executing a plurality of virtual simulations of the contingency plan;

after executing the contingency plan in real-time, compare the execution of the contingency plan to the plurality of virtual simulations; and based on the comparing, generating a validation score indicating effectiveness of the contingency plan.

\* \* \* \* \*